United States Patent [19]

Rubio

[11] Patent Number: 5,215,466

[45] Date of Patent: * Jun. 1, 1993

[54] MOVING MESSAGE LEARNING SYSTEM AND METHOD

[76] Inventor: Rafael R. Rubio, 5134 Pendleton St., San Diego, Calif. 92109

[*] Notice: The portion of the term of this patent subsequent to Sep. 8, 2009 has been disclaimed.

[21] Appl. No.: 892,175

[22] Filed: Jun. 2, 1992

Related U.S. Application Data

[63] Continuation of Ser. No. 481,633, Feb. 20, 1990, Pat. No. 5,145,375.

[51] Int. Cl.⁵ ............................................. G09B 19/06
[52] U.S. Cl. ..................................... 434/157; 434/182
[58] Field of Search .................. 434/157, 182; 340/334

[56] References Cited

U.S. PATENT DOCUMENTS

| | | | |
|---|---|---|---|
| 3,369,308 | 2/1968 | Curran | 434/157 |
| 3,493,956 | 2/1970 | Andrews et al. | 340/334 |
| 4,024,531 | 5/1977 | Ashby | 340/334 |
| 4,162,493 | 7/1979 | Ross et al. | 340/752 |
| 5,145,375 | 9/1992 | Rubio | 434/157 |

Primary Examiner—Richard J. Apley
Assistant Examiner—Karen A. Jalbert
Attorney, Agent, or Firm—Baker, Maxham, Jester & Meador

[57] ABSTRACT

A moving message learning system comprises a panel capable of displaying a moving message, a programmable controller for controlling the display of a message on the panel in a moving manner, and for displaying at least two different versions of a subject to be learned. The method of learning a subject comprises the steps of selecting an apparatus having a moving message display for displaying a moving message, establishing a graphic display of at least two versions of a subject to be learned on the moving message display means, and moving the versions along the display at a selected velocity while observing same.

4 Claims, 1 Drawing Sheet

MOVING MESSAGE LEARNING SYSTEM AND METHOD

This is a continuation of copending application Ser. No. 07/481,633 filed on Feb. 20, 1990, now U.S. Pat. No. 5,145,375.

BACKGROUND OF THE INVENTION

The present invention relates generally to teaching systems and methods and pertains particularly to an improved moving message learning system and method.

A great number of teaching systems and methods have been developed in the past and have been used with varying degrees of success. Visual aids wherein questions and answers and other graphic materials or information are flashed by flash cards or on a screen is one of the oldest systems used. Many of these systems utilize films, slides and other projectable graphic material.

The development of the microprocessor in recent years has led to a development of interactive teaching systems wherein programmed computers control the display of text, graphics and the like on video screens. Many of these systems are programmed for interactive response by the student. These systems, however, while highly effective for many applications, are very expensive and may not be entirely suited for certain applications. An example of this type of educational system is that disclosed in U.S. Pat. No. 4,492,582, issued Jan. 8, 1985 to Chang et al. In this system, a teaching and entertainment device includes a desk top console which supports a keyboard, a LCD display matrix, and a plug-in cartridge receptacle. A quartet of LCD drivers each control a quadrant of the display under the control of a first microprocessor. A plug-in cartridge is insertable into the console and contains a second microprocessor. Apparatus is provided for establishing a master/servant relationship of the second microprocessor over the first whenever the plug-in cartridge is present.

Simple information display systems are also well known in the art. Many such systems, however, have been developed for displaying and presenting of information, but are not considered as educational systems. Examples of these systems are disclosed, for example, in U.S. Pat. No. 4,162,493, issued Jul. 24, 1979 to Ross et al. This patent is directed to a graphic display system in which lights of an array are arranged in dot matrix form, and are illuminated to produce the illusion of a moving sign displaying letters, words, numbers, etc. These are primarily utilized as advertising vehicles wherein the apparent motion of a moving image is produced to catch the attention of the consumer.

Another example of traveling message display is that disclosed in U.S. Pat. No. 3,493,956, issued Feb. 3, 1970 to Andrews et al. That patent discloses a completely electronic traveling message display system. A matrix of lamps are sequentially enabled to give the illusion of a traveling message. Such systems are widely used for advertising display and are also used for message display, such as display of stock exchange quotes.

I have conceived a modification of such systems and a method of programming and use of such systems which provides a highly efficient educational or learning system and method.

SUMMARY AND OBJECTS OF THE INVENTION

It is the primary object of the present invention to provide an improved learning system and method.

In accordance with a primary aspect of the present invention, a learning system comprises a program to display a subject to be learned in a highly visible moving fashion for stimulating interest and concentration.

BRIEF DESCRIPTION OF THE DRAWING

The above and other objects and advantages of the present invention will become apparent from the following description when read in conjunction with the accompanying drawings wherein.

DETAILED DESCRIPTION OF A PREFERRED EMBODIMENT

The present educational system and method have been developed to provide a highly effective system and method for teaching and learning subject matter. The system is based on the understanding that movement attracts attention, and also movement onto and off of a screen of a message requires concentration in order to decipher and understand the message during the interval that it is visible. The system combines components of known systems to provide a system that first attracts attention, and secondly forces concentration for most effective learning.

Figure 1:
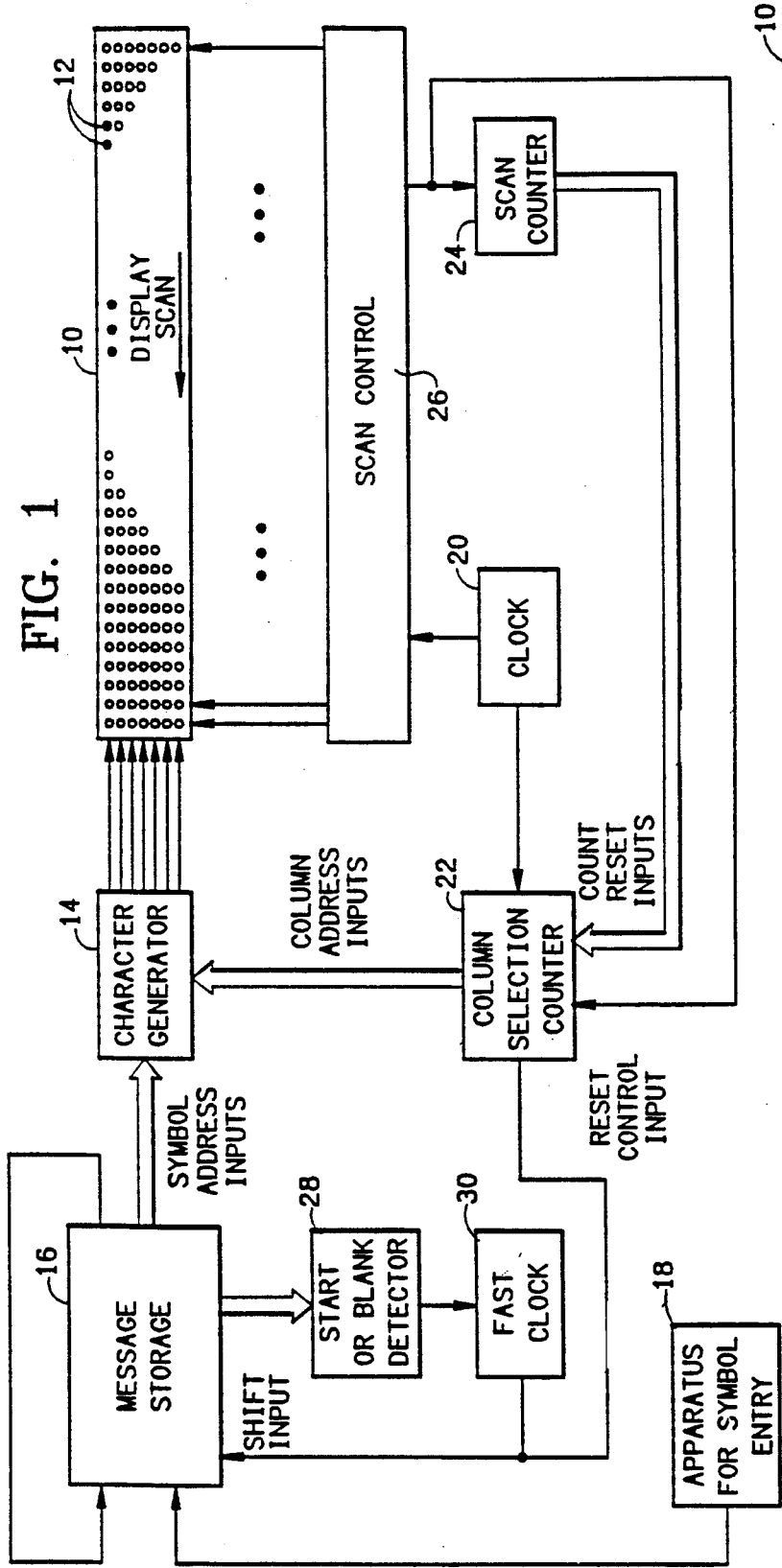
FIG. 1 schematically illustrates an exemplary embodiment of a moving message teaching system in accordance with the invention.

Referring specifically to FIG. 1, there is schematically illustrated a system comprising a display screen or panel 10, defined by a matrix of LEDs 12 or other suitable light emitting elements that are controlled by a system to create a moving or traveling display of verbal or graphic subject matter.

The basic system is based on the combination of components assembled to provide various sequences of programmable messages displayed in selected sequence and at a selected rate of movement. Systems capable of modification to provide such a system and method as herein described are disclosed in the Andrews et al Patent, U.S. Pat. No. 3,493,956, which is incorporated herein fully by reference as though fully set forth. That system is capable of being programmed to provide a traveling message display in accordance with the invention. The Ross et al Patent, U.S. Pat. No. 4,162,493, entitled Graphic Display Systems, is also incorporated herein by reference as though fully set forth.

Another suitable system is also available on the market from Dynasty of Carson, Calif. under the name or mark "MOVING MESSAGE", as models 7000 and 7003. These display devices are designed for advertising, and can be programmed to display a moving graphic image or a message or both on a panel of lights or LEDs. The device has a keyboard that enables input to create various messages and symbols in the form of a dot matrix of lights on the panel that appear to be moving across the panel.

In accordance with the invention, as illustrated, a message display board or panel 10 is formed by a matrix of LEDs 12 or similar light generating devices. These devices are capable of being selectively lighted in sequence to provide various messages, such as illustrated. As shown in FIG. 1, a system for operating the display panel or system is schematically illustrated and comprises in its broadest sense a character generator 14, having a message store or memory 16, and an input such as a keyboard 18 all interfaced with the display panel 10. The character generator 14 determines which of the LEDs are to be illuminated to form a symbol or character. The message store 16 may be a multistage shift register in which a stage can contain a code of bits that represents a selected symbol.

A clock generator 20 is connected to count inputs of a column selection counter 22 and a scan counter 24. The column selection counter is arranged to count down in sequence from n down to zero and returning to n and repeating the sequence continuously. The scan control 26 is programmed to apply enabling signals to all of the LEDs in the display 10 in a column by column scan sequence. A start or blank detector circuit 28 is connected to a fast clock pulse generator 30. The fast clock 30 is connected by way of suitable switching circuits to the shift input of the message store 16. It will be appreciated that the above described system may be in the form of a programmed Central Processing Unit (CPU).

Figure 3:
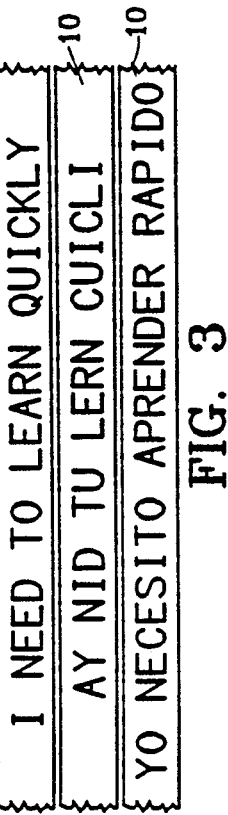
FIG. 3 is a schematic illustration like FIG. 2 of an alternate embodiment.
Figure 2:
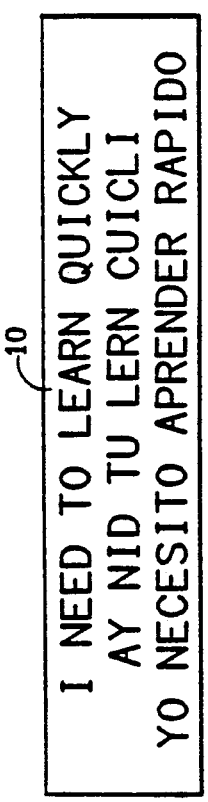
FIG. 2 is a schematic diagram of a moving message teaching display in accordance with a first embodiment the invention.

In accordance with the method, a system, such as above described, capable of providing a moving display is programmed to teach a subject, such as a foreign language, by the steps of first selecting the desirable words and/or phrases. The foreign language phrases or words are first programmed to display in a moving fashion on the screen, with the phonetic pronunciation of those words or phrases immediately following the foreign language version, and thereafter followed for example by a subject's own language equivalent version, as shown in FIG. 3. These phrases may also be displayed simultaneously, as illustrated in FIG. 2. In other words, the components to be learned are presented in direct sequence by at least two, but preferably three versions of the subject or component thereof.

The system can be used to teach a certain amount of vocabulary in a similar manner. For example, a picture or diagram of an animal or object can be displayed, followed first by the name in normal or usual form, and then in phonetic form. This gives the student a general picture of the object, the name of the object, the correct spelling and the correct pronunciation. A foreign language can also be taught in this fashion by the use of a general picture of a subject or object.

The movement of these displays forces the student to concentrate to read and verbalize the words and phrases prior to movement of the message from the screen. The speed of movement of the display can be controlled to challenge the student's capacity to its optimum. A combination of this movement of the subject studied in combination with periodic repetitions of the same subject reinforces the subject in the student's mind.

Other subjects can be taught in a similar manner by first posing a question, and second displaying the answer. Variations of this may, for example, provide multiple choices, with the preferred answer ultimately displayed.

Still other variations of the system can accommodate interaction by the student to stop or change the velocity of the display. Further, the system can require a continuous moving display of the same question or problem until the student activates a response corresponding to the correct answer. When the correct answer is selected, the system moves on to the next question. Periodic repetition of the questions can be presented to reinforce the learning.

Thus, from the above description, it is seen that I have provided a system and method for highly efficient and concentrated study and learning of a subject matter.

While I have illustrated and described my invention by means of specific embodiments, it is to be understood that numerous changes and modifications may be made therein without departing from the spirit and scope of the invention as defined in the appended claims.

I claim:

1. A method of learning a subject comprising the steps of:
    selecting rigid apparatus having moving message display means comprising a matrix of light generating elements capable of forming a plurality of alpha-numeric characters for displaying a plurality of visually continuously moving, selectively repetitive messages with no externally visible moving parts comprised in the moving message, and programmable means for selectively generating changeable continuously moving messages comprised of alpha-numeric characters by means of said light generating elements;
    programming said programmable means for selectively generating and causing the continuously moving visual display of a plurality of versions of at least one word or concept at a time of the subject to be learned on said moving message display means;
    establishing and controlling a graphic visual display of said plurality of versions of the subject to be learned on said moving message display means, said versions being programmed for teaching a foreign language; and
    controllably moving said versions along said display means at a selected velocity while observing same.

2. A method of learning according to claim 1 wherein the versions of said subject are first a foreign language phrase, secondly a phonetic equivalent of the displayed phrase, and thirdly the student's language version of the foreign phrase.

3. A method of teaching a subject comprising the steps of:
    selecting an apparatus having a rigid message display panel comprising a matrix of light generating elements capable of forming a plurality of alpha-numeric characters and simultaneously displaying a plurality of visually continuously moving, selectively repetitive messages and programmable means for generating a moving message for display on said panel, which panel has no externally visible moving parts relating to displaying said moving messages;
    programming said programmable means for selectively generating, controlling and establishing a simultaneous graphic display of a plurality of versions of at least one word or concept at a time in alpha-numeric characters of the subject to be taught on said moving message display panel;
    activating said programmable means for generating, controlling and establishing a simultaneous graphic visual display of said plurality of versions and continuously visually moving said versions of the subject across said display panel at a selective velocity for concentrated observation of same, said versions being programmed for teaching a foreign language; and controlling the rate of movement of the versions across the display panel and selectively controlling the repetition of any such version being displayed and moving across the display panel.

4. A method of learning according to claim 3 wherein the versions of said subject are first a foreign language phrase, secondly a phonetic equivalent of the displayed phrase, and thirdly the student's language version of the foreign phrase.

* * * * *